(12) United States Patent
Singh et al.

(10) Patent No.: US 8,381,530 B2
(45) Date of Patent: Feb. 26, 2013

(54) SYSTEM AND METHOD FOR CONTROLLING COMBUSTION DYNAMICS

(75) Inventors: Kapil Kumar Singh, Rexford, NY (US); Fei Han, Clifton Park, NY (US); Shiva Srinivasan, Greer, SC (US); Kwanwoo Kim, Greer, SC (US)

(73) Assignee: General Electric Company, Niskayuna, NY (US)

( * ) Notice: Subject to any disclaimer, the term of this patent is extended or adjusted under 35 U.S.C. 154(b) by 835 days.

(21) Appl. No.: 12/431,095

(22) Filed: Apr. 28, 2009

(65) Prior Publication Data

US 2010/0269505 A1 Oct. 28, 2010

(51) Int. Cl.
*F02C 7/22* (2006.01)

(52) U.S. Cl. ............ 60/772; 60/742; 60/734; 60/725; 431/12

(58) Field of Classification Search .......... 60/725, 60/734, 737, 740, 742, 746, 772; 431/12
See application file for complete search history.

(56) References Cited

U.S. PATENT DOCUMENTS

| | | | | |
|---|---|---|---|---|
| 4,326,376 A | * | 4/1982 | Stearns et al. | 60/39.281 |
| 4,827,714 A | * | 5/1989 | Miles | 60/764 |
| 4,833,878 A | * | 5/1989 | Sood et al. | 60/778 |
| 5,284,020 A | * | 2/1994 | Brocard et al. | 60/739 |
| 6,240,945 B1 | * | 6/2001 | Srinath et al. | 137/14 |
| 6,857,272 B2 | * | 2/2005 | Summerfield et al. | 60/739 |
| 6,895,758 B2 | | 5/2005 | Knight | |
| 7,128,082 B1 | * | 10/2006 | Cerretelli et al. | 137/14 |
| 7,347,050 B2 | * | 3/2008 | Gainford | 60/734 |
| 2007/0074519 A1 | | 4/2007 | Hadley | |
| 2007/0289308 A1 | * | 12/2007 | Nest | 60/772 |

OTHER PUBLICATIONS

D. Guyot, B. Bobusch, C. O. Paschereit and S. Raghu; "Active Combustion Control Using a Fluidic Oscillator for Asymmetric Fuel Flow Modulation";44th AIAA/ASME/SAE/ASEE Joint Propulsion Conference & Exhibit; AIAA 2008-4956; 19 pages.

* cited by examiner

*Primary Examiner* — Ehud Gartenberg
*Assistant Examiner* — Karthik Subramanian
(74) *Attorney, Agent, or Firm* — Ann M. Agosti

(57) ABSTRACT

A tunable fluid flow control system for controlling combustion dynamics in a combustor is disclosed. The control system includes a fuel supply path having an inlet portion, a first diverted portion, a second diverted portion, and an exit portion. A first diverted portion has a first length and a first diameter. A second diverted portion has a second length and a second diameter and spaced apart from the first diverted portion. The first and second diverted portions converge at a merging location. The exit portion is coupled to the merging location of the first and second diverted portions. At least one flow regulation device is coupled to the inlet portion and configured to divert fuel flow to the first and second diverted portions alternately to generate fuel flow perturbations at the merging location.

22 Claims, 3 Drawing Sheets

SYSTEM AND METHOD FOR CONTROLLING COMBUSTION DYNAMICS

BACKGROUND

The invention relates generally to control of combustion dynamics in a combustor, and more particularly to a fail-safe and tunable system and method for controlling combustion dynamics in a combustor.

Rotary engines, such as gas turbines, extract energy from a flow of combustion gas. A gas turbine typically includes a compressor coupled to a downstream turbine through a combustor. Combustion gas is generated by combusting a mixture of air and fuel in the combustor. Combustion increases the temperature, velocity and volume of the gas flow. The combustion gas is directed through a nozzle over the turbine's blades, spinning the turbine and powering the compressor.

Lean premixed combustion (LPC) is currently one of the most promising concepts for substantial reduction of emissions while maintaining high efficiency for gas turbine combustors. This mode of combustion is operated with excess air to reduce flame temperatures in combustors to acceptable levels typically less than 1800 Kelvin. At these flame temperatures, the production of thermal NOX (oxides of nitrogen) is virtually eliminated; the production of prompt NOX is negligible. This intrinsic benefit can be offset by several potential disadvantages. LPC systems can have problems with flame stability, noise, and can exhibit system dynamic responses (combustion instabilities).

Combustion dynamics (or instability) is well known problem encountered by the lean premixed combustion systems leading to operational restrictions and even to potential hardware downtime. Fluctuations in fuel-air-ratio may play a vital role in driving the combustion dynamics. There may be primarily two approaches to control combustion dynamics. The first approach may be to control the generating mechanism itself by using fuel-flow fluctuations to drive the stability, for example. A second approach may be to suppress the dynamics generated by using resonators inside combustors, for example, to suppress combustion dynamics. The approaches so far to obtain the fuel flow fluctuations have been to either use high-frequency mechanical modulator valves or fluidic oscillators. The usage of modulator valves or fluidic oscillators has a drawback that a failure of the modulator valve or fluidic oscillator can lead to a disruption of fuel supply to gas turbine causing shutdown. The characteristic response frequency and the amplitude of the fluidic oscillator cannot be controlled.

It is desirable to have a fail-safe and tunable system and method for controlling combustion dynamics in a combustor.

BRIEF DESCRIPTION

In accordance with one exemplary embodiment of the present invention, a tunable fluid flow control system for controlling combustion dynamics in a combustor is disclosed. The control system includes a fuel supply path having an inlet portion, a first diverted portion, a second diverted portion, and an exit portion. A first diverted portion has a first length and a first diameter. A second diverted portion has a second length and a second diameter and spaced apart from the first diverted portion. The first and second diverted portions converge at a merging location. The exit portion is coupled to the merging location of the first and second diverted portions. At least one flow regulation device is coupled to the inlet portion and configured to divert fuel flow to the first and second diverted portions alternately to generate fuel flow perturbations at the merging location.

In accordance with another exemplary embodiment of the present invention, a tunable fluid flow control system for controlling combustion dynamics in a combustor is disclosed. Frequency and amplitude of the fuel flow perturbations is controlled based on a plurality of parameters related to the fuel supply path and the flow regulation device.

In accordance with yet another exemplary embodiment of the present invention, a method for controlling combustion dynamics in a combustor is disclosed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, certain embodiments of the present invention disclose a tunable fluid flow control system for controlling combustion dynamics in a combustor. The control system includes a fuel supply path having an inlet portion, a first diverted portion, a second diverted portion, and an exit portion. The first diverted portion has a first length and a first diameter extending from the inlet portion. The second diverted portion has a second length and second diameter extending from the inlet portion and spaced apart from the first diverted portion. The second diverted portion and the first diverted portion converge at a merging location. The exit portion is coupled to the merging location of the first and second portions. At least one flow regulation device is coupled to the inlet portion and configured to divert fuel flow to the first and second diverted portions alternately to generate fuel flow perturbations at the merging location and the exit portion. The exemplary fluid flow control system is a fail-safe fluidic oscillator configured to generate fuel flow perturbations and control combustion dynamics within the combustor. Mechanical components are not provided in the fuel supply path. Fluidics is used to generate fuel flow fluctuations in the fuel supply path. The fuel supply path operates on a principle of bi-stable valves or PAFS (Preferential Asymmetric Fluidic Switch) to divert the fuel flow to two different passages of different area and length alternatively to generate fuel flow perturbations and control combustion dynamics.

Figure 1:
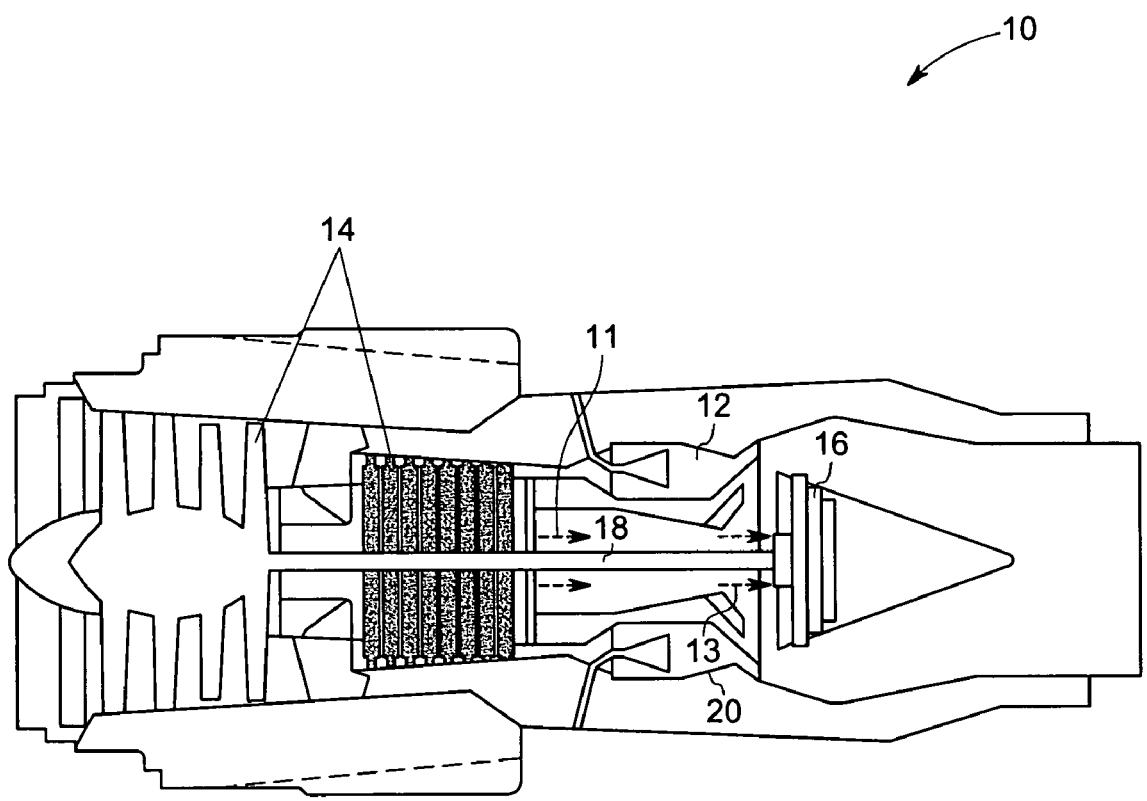
FIG. 1 is a diagrammatical illustration of a gas turbine having a combustor in accordance with an exemplary embodiment of the present invention.

Turning now to drawings and referring first to FIG. 1, a gas turbine 10 having a low emission combustor 12 is illustrated. The gas turbine 10 includes a compressor 14 configured to compress ambient air. The combustor 12 is in flow communication with the compressor 14 and is configured to receive compressed air 11 from the compressor 14 and to combust a fuel stream to generate a combustor exit gas stream 13. In certain embodiments, the fuel may include hydrocarbons, natural gas, or high hydrogen gas, or hydrogen, or biogas, or carbon monoxide, or syngas along with predetermined amount of diluents. In some embodiments, the fuel may include liquid fuels. In one embodiment, the combustor 12 includes a can combustor. In an alternate embodiment, the combustor 12 includes a can-annular combustor or a purely annular combustor. In addition, the gas turbine 10 includes a turbine 16 located downstream of the combustor 12. The turbine 16 is configured to expand the combustor exit gas stream 13 to drive an external load. In the illustrated embodiment, the compressor 14 is driven by the power generated by the turbine 16 via a shaft 18. In the illustrated embodiment, the combustor 12 includes a combustor housing 20 defining a combustion area. It should be noted herein that the configuration of gas turbine 10 might vary depending on the application.

Figure 2:
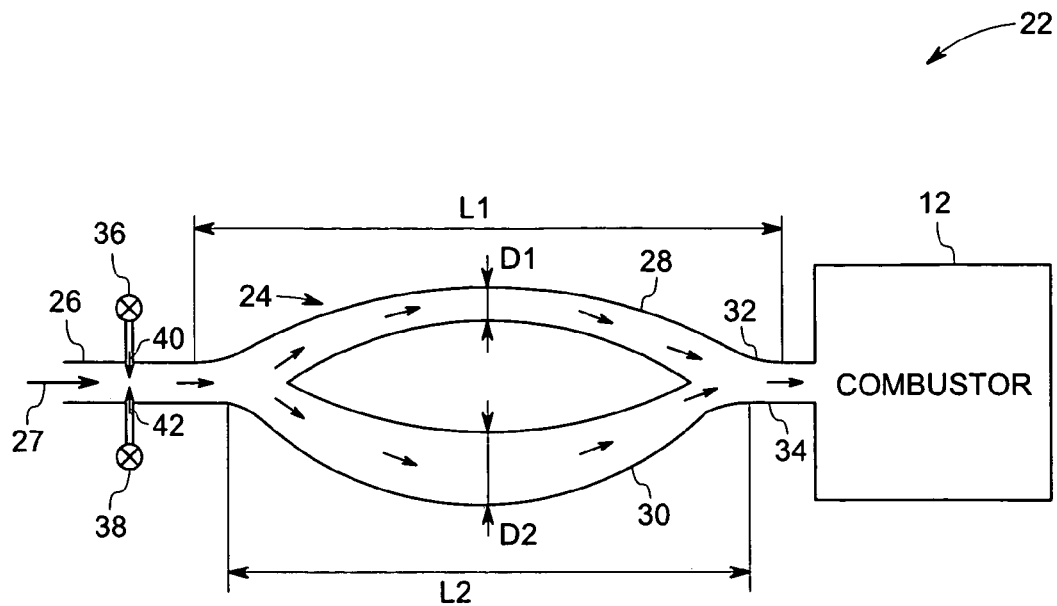
FIG. 2 is a diagrammatical illustration of a tunable fluid flow control system for controlling combustion dynamics in a combustor in accordance with an exemplary embodiment of the present invention.

Referring to FIG. 2, a tunable fluid flow control system 22 for controlling combustion dynamics in the combustor 12 is disclosed. In the illustrated embodiment, the system 22 includes a fuel supply path 24 configured to supply fuel to the combustor 12. The fuel supply path 24 includes a fuel inlet portion 26 through which a fuel stream 27 enters the fuel supply path 24. The fuel supply path 24 bifurcates from the inlet portion 26 into a first diverted portion 28 and a second diverted portion 30. The first diverted portion 28 is spaced apart from the second diverted portion 30. In the illustrated embodiment, the first diverted portion 28 has a first length (L1) and a first diameter (D1). The second diverted portion 30 has a second length (L2) and a second diameter (D2). In one embodiment, the first length (L1) may be greater than the second length (L2). In another embodiment, the first length (L1) may be less than the second length (L2). Similarly, the first diameter (D1) may be greater or less than the second diameter (D2) depending on the application. The first and second diverted portions 28, 30 converge at a downstream merging location 32. A fuel exit portion 34 extends from the merging location 32 to the combustor 12 and is configured to direct the fuel stream to the combustor.

As discussed previously, combustion dynamics (or instability) is well known problem encountered by the lean premixed combustion systems leading to operational restrictions and even to potential hardware downtime. Fluctuations in fuel-air-ratio may play a vital role in driving the combustion dynamics. Conventional approaches so far to obtain the fuel flow fluctuations have been to either use high-frequency mechanical modulator valves or fluidic oscillators in the fuel supply path. The usage of modulator valves or fluidic oscillators has a drawback that a failure of the modulator valve or fluidic oscillator can lead to disruption of fuel supply to gas turbine causing shutdown. The characteristic response frequency and the amplitude of the fluidic oscillator cannot be controlled.

In the illustrated embodiment, two flow regulation devices 36, 38 are coupled respectively to either sides of the inlet portion 26 of the fuel supply path 24. In one embodiment, the flow regulation devices 36, 38 include modulator valves. One flow regulation device 36 is configured to control flow of a first control fluid stream 40 into the inlet portion 26. The other flow regulation device 38 is configured to control flow of a second control fluid stream 42 into the inlet portion 26. The flow regulation devices 36, 38 are configured to control flow of the first control fluid stream 40 and the second control fluid stream 42 alternately from mutually opposite directions to the inlet portion 26 to divert fuel flow to the first and second diverted portions 28, 30 alternately.

One control fluid stream is used to divert fuel flow to one diverted portion and the other control fluid stream is used to divert fuel flow to the other diverted portion. In the illustrated embodiment, when the first flow regulation device 36 is open, the first control fluid stream 40 is used to divert fuel flow to the second diverted portion 30 and, when the second flow regulation device 38 is open, the second control fluid stream 42 is used to divert fuel flow to the first diverted portion 28. The alternate diversion of fuel flow to the first and second diverted portions 28, facilitates to generate fuel flow perturbations at the merging location 32 and at the exit portion 34. Both the control fluid streams 40, 42 may be controlled by independent high-frequency modulator valves 36, 38, or may be controlled by one diverter valve.

It should be noted herein that the frequency and amplitude of the fuel flow perturbations may be controlled based on a plurality of parameters related to the fuel supply path 24 and the flow regulation devices 36, 38. In one embodiment, frequency of generated fuel flow perturbations is controlled based on frequency of operation of the flow regulation devices 36, 38. In another embodiment, amplitude of generated fuel flow perturbations is controlled based on amount of fuel diverted to the first and second diverted portions 28, 30 alternately, first length (L1), first diameter (D1), second length (L2), second diameter (D2), or combinations thereof.

Figure 3:
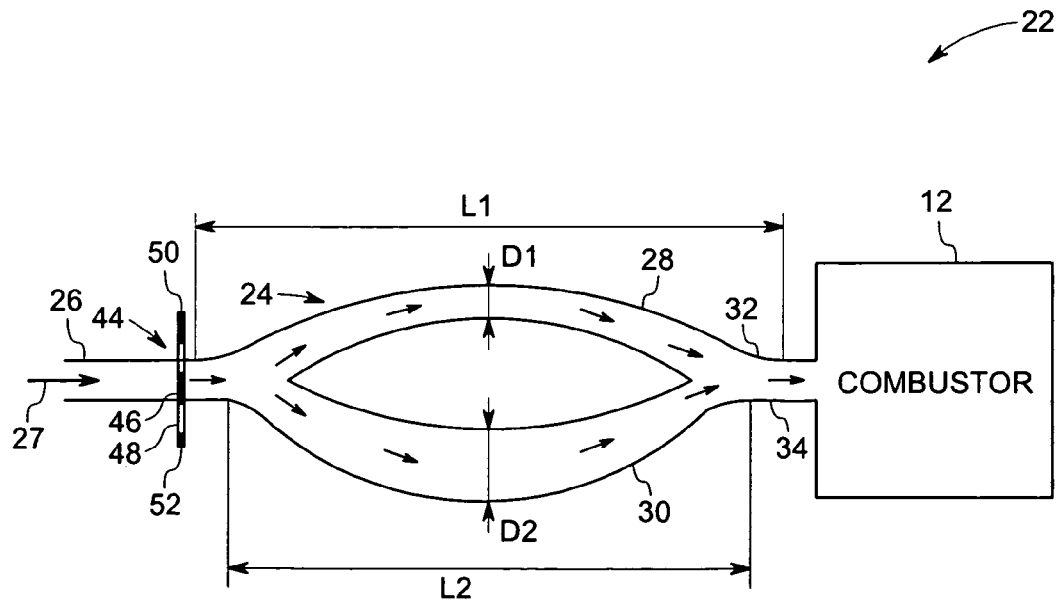
FIG. 3 is a diagrammatical illustration of a tunable fluid flow control system for controlling combustion dynamics in a combustor in accordance with an exemplary embodiment of the present invention.

Referring to FIG. 3, a tunable fluid flow control system 22 for controlling combustion dynamics in the combustor 12 is disclosed. In the illustrated embodiment, the system 22 includes a fuel supply path 24 configured to supply fuel to the combustor 12. The configuration of the fuel supply path 24 is the same as discussed in the previous embodiment. In the illustrated embodiment, a flow regulation device 44 is provided to the inlet portion 26 of the fuel supply path 24. It should be noted herein that the flow regulation device 44 is a diverter valve. The flow regulation device 44 includes a reciprocating member 46 disposed movably in a channel 48. The reciprocating member 46 is coupled via a link to a rotary drive member (not shown). The reciprocating member 46 may be moved within the channel 48 in such a way so as to control flow of the first and second control fluid streams and diverts fuel flow to the first and second diverted portions 28, 30 alternately. In other words, when the reciprocating member 46 is moved towards one end portion 50, the fuel flow is diverted to the second diverted portion 30, and when the reciprocating member 46 is moved towards another end portion 52, the fuel flow is diverted to the first diverted portion 28 via the control fluid streams. The alternate diversion of fuel flow to the first and second diverted portions 28, 30 facilitates to generate fuel flow perturbations at the merging location 32 and at the exit portion 34 resulting in control of combustion dynamics within the combustor 12.

In accordance with the embodiments discussed above, mechanical components are not provided inside the fuel supply path, thus averting possibility of unscheduled shutdown of the unit. This exemplary arrangement provides a fail-safe system whose frequency can be controlled by the frequency of operation of control flows and amplitude by the amount of fuel or fluid being switched around.

Figure 4:
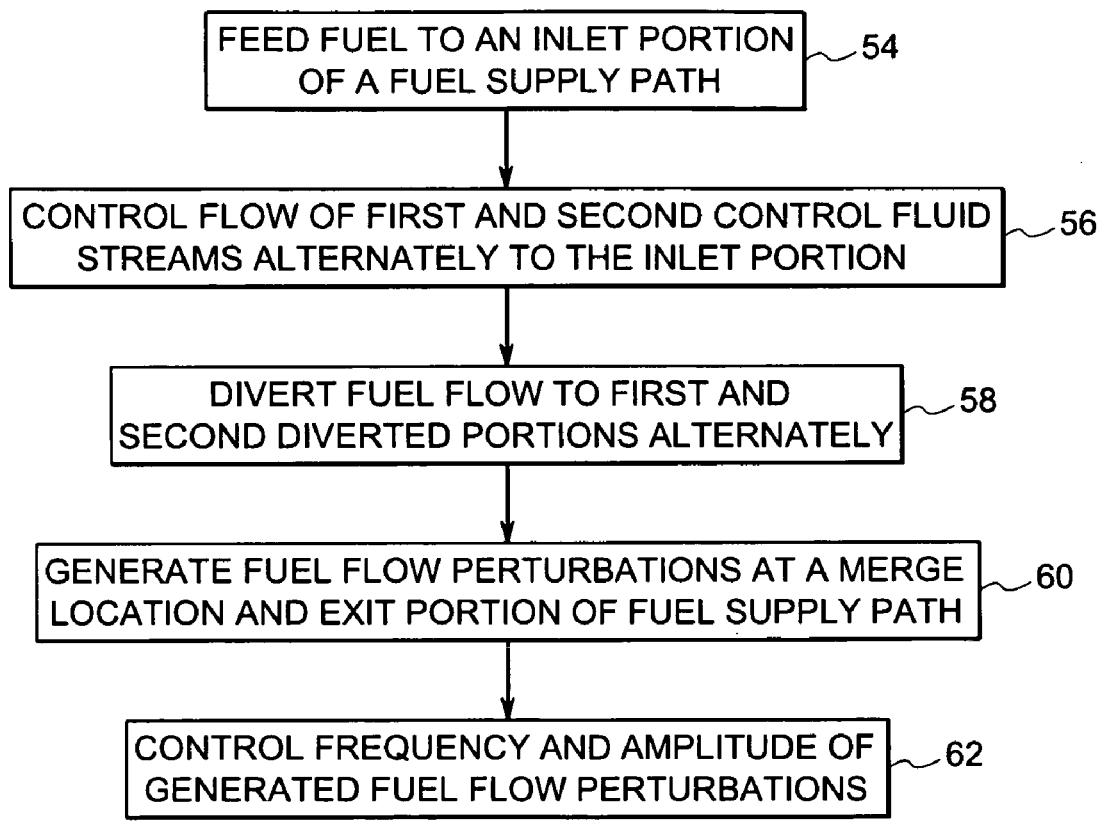
FIG. 4 is a flow chart illustrating exemplary steps involved in controlling combustion dynamics in a combustor in accordance with an exemplary embodiment of the present invention.

Referring to FIG. 4, a flow chart illustrating exemplary steps involved in controlling combustion dynamics within a combustor is disclosed. A fuel stream is fed to a fuel supply path via a fuel inlet portion as represented by the step 54. Alternate flow of a first control fluid stream and a second control fluid stream is controlled from mutually opposite directions to the inlet portion as represented by the step 56. In one embodiment, independent modulator valves (flow regulation devices) may be used to control flow of the first control fluid stream and the second control fluid stream alternately into the inlet portion of the fuel supply path. In another embodiment, a single diverter valve (flow regulation device) may be used to control flow of the first control fluid stream and the second control fluid stream alternately into the inlet portion of the fuel supply path.

Flow of the first control fluid stream and the second control fluid stream alternately from mutually opposite directions to the inlet portion 26 is controlled to divert fuel flow to the first and second diverted portions alternately as represented by the step 58. One control fluid stream is used to divert fuel flow to one diverted portion and the other control fluid stream is used to divert fuel flow to the other diverted portion.

The alternate diversion of fuel flow to the first and second diverted portions facilitates to generate fuel flow perturbations at a merging location and at an exit portion of the fuel supply path as represented by the step 60. The exemplary control technique further includes controlling the frequency and amplitude of the fuel flow perturbations based on a plurality of parameters related to the fuel supply path and the flow regulation devices as represented by the step 62. In one embodiment, frequency of generated fuel flow perturbations is controlled based on frequency of operation of the flow regulation devices. In another embodiment, amplitude of generated fuel flow perturbations is controlled based on amount of fuel diverted to the first and second diverted portions alternately, length of the diverted portions, diameter of the diverted portions, or combinations thereof.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A tunable fluid flow control system for controlling combustion dynamics in a combustor, the system comprising:
    a fuel supply path comprising;
        an inlet portion;
        a first diverted portion having a first length and a first diameter extending from the inlet portion;
        a second diverted portion having a second length different from the first length and a second diameter different from the first diameter and extending from the inlet portion and spaced apart from the first diverted portion, wherein the second diverted portion and the first diverted portion converge at a merging location; and
        an exit portion coupled to the merging location of the first and second diverted portions; and
    at least one flow regulation device coupled to the inlet portion and configured to divert fuel flow to the first and second diverted portions alternately to generate fuel flow perturbations at the merging location.

2. The control system of claim 1, wherein the at least one flow regulation device is configured to control flow of a first control fluid stream and a second control fluid stream alternately from mutually opposite directions to the inlet portion to divert fuel flow to the first and second diverted portions alternately.

3. The control system of claim 2, wherein the first control fluid stream is used to divert the fuel flow to the second diverted portion.

4. The control system of claim 2, wherein the second control fluid stream is used to divert the fuel flow to the first diverted portion.

5. The control system of claim 2, wherein the at least one flow regulation device comprises a modulator valve.

6. The control system of claim 5, wherein the modulator valve comprises a first modulator valve and a second modulator valve configured to respectively control flow of a first control fluid stream and a second control fluid stream alternately from mutually opposite directions to the inlet portion.

7. The control system of claim 1, wherein the at least one flow regulation device comprises a diverter valve.

8. The control system of claim 1, wherein frequency of generated fuel flow perturbations is controlled based on frequency of operation of the at least one flow regulation device.

9. The control system of claim 1, wherein amplitude of generated fuel flow perturbations is controlled based on at least one of amount of fuel diverted alternately to the first and second diverted portions, the first length, the first diameter, the second length, and the second diameter.

10. A tunable fluid flow control system for controlling combustion dynamics in a combustor, the system comprising:
    a fuel supply path comprising;
        an inlet portion;
        a first diverted portion having a first length and a first diameter extending from the inlet portion;
        a second diverted portion having a second length different from the first length and a second diameter different from the first diameter and extending from the inlet portion and spaced apart from the first diverted portion; wherein the second diverted portion and the first diverted portion converge at a merging location; and
        an exit portion coupled to the merging location of the first and second diverted portions; and
    at least one flow regulation device coupled to the inlet portion and configured to divert fuel flow to the first and second diverted portions alternately to generate fuel flow perturbations at the merging location; wherein frequency and amplitude of the fuel flow perturbations is controlled based on a plurality of parameters comprising frequency of operation of the at least one flow regulation device, and at least one of amount of fuel diverted alternately to the first and second diverted portions, the first length, the first diameter, the second length and the second diameter.

11. The control system of claim 10, wherein the at least one flow regulation device is configured to control flow of a first control fluid stream and a second control fluid stream alternately from mutually opposite directions to the inlet portion to divert fuel flow to the first and second diverted portions alternately.

12. The control system of claim 11, wherein the first control fluid stream is used to divert the fuel flow to the second diverted portion.

13. The control system of claim 11, wherein the second control fluid stream is used to divert the fuel flow to the first diverted portion.

14. The control system of claim 11, wherein the at least one flow regulation device comprises a modulator valve.

15. The control system of claim 14, wherein the modulator valve comprises a first modulator valve and a second modulator valve configured to respectively control flow of a first control fluid stream and a second control fluid stream alternately from mutually opposite directions to the inlet portion.

16. The control system of claim 10, wherein the at least one flow regulation device comprises a diverter valve.

17. A method for controlling combustion dynamics in a combustor, the method comprising:
feeding a fuel to an inlet portion of a fuel supply path,
diverting fuel flow from the inlet portion to a first diverted portion having a first length and a first diameter and a second diverted portion having a second length different from the first length, and a second diameter different from the first diameter alternately using at least one flow regulation device; to generate fuel flow perturbations at a merging location of the first and second diverted portions.

18. The method of claim 17, further comprising controlling flow of a first control fluid stream and a second control fluid stream alternately from mutually opposite directions to the inlet portion via the at least one flow regulation device to divert fuel flow to the first and second diverted portions alternately.

19. The method of claim 18, comprising diverting the fuel flow to the second diverted portion via the first control fluid stream.

20. The method of claim 18, comprising diverting the fuel flow to the first diverted portion via the second control fluid stream.

21. The method of claim 18, further comprising controlling frequency of generated fuel flow perturbations based on frequency of operation of the at least one flow regulation device.

22. The method of claim 18, further comprising controlling amplitude of generated fuel flow perturbations based on at least one of amount of fuel diverted alternately to the first and second diverted portions, the first length, the first diameter, the second length, and the second diameter.

* * * * *